US006203928B1

(12) United States Patent
Lewin

(10) Patent No.: US 6,203,928 B1
(45) Date of Patent: Mar. 20, 2001

(54) HOUSINGS FOR PARKING METERS AND OTHER OUTDOOR TOKEN HANDLING DEVICES AND METHOD OF MAKING AND REFURBISHING SAME

(75) Inventor: Scott Jay Lewin, 1100 S. Hillcrest Ct., #215, Hollywood, FL (US) 33021

(73) Assignees: Stanley Kotler; Alan H. Kepke, both of Hialeah; Scott Jay Lewin, Hollywood, all of FL (US)

( * ) Notice: Subject to any disclaimer, the term of this patent is extended or adjusted under 35 U.S.C. 154(b) by 0 days.

(21) Appl. No.: 08/841,724

(22) Filed: Apr. 24, 1997

(51) Int. Cl.[7] ........................... B32B 15/08; B32B 27/36; B32B 27/40; G07F 9/10

(52) U.S. Cl. .......................... 428/626; 428/659; 428/334; 428/425.8; 428/458; 428/463; 194/350

(58) Field of Search ................................ 428/425.8, 458, 428/659, 626, 463, 681, 332, 334; 194/350

(56) References Cited

U.S. PATENT DOCUMENTS

| | | | | |
|---|---|---|---|---|
| 3,090,696 | | 5/1963 | Gemmer | 427/185 |
| 3,674,445 | | 7/1972 | Wlodek | 428/624 |
| 3,770,090 | * | 11/1973 | Fayling et al. | 194/350 |
| 3,942,470 | | 3/1976 | Fry | 118/310 |
| 4,183,205 | | 1/1980 | Kaiser | 368/90 |
| 4,243,867 | | 1/1981 | Earle et al. | 219/121.63 |
| 4,356,903 | | 11/1982 | Lemelson et al. | 194/217 |
| 4,358,508 | | 11/1982 | Tanaka et al. | 428/458 |
| 4,401,724 | | 8/1983 | Moskowitz et al. | 428/564 |
| 4,540,637 | | 9/1985 | Geary et al. | 428/626 |
| 4,562,714 | * | 1/1986 | Tanaka et al. | 72/46 |
| 5,000,989 | | 3/1991 | Ford | 427/387 |
| 5,130,165 | | 7/1992 | Shao et al. | 427/543 |
| 5,544,399 | | 8/1996 | Bishop et al. | 29/25.41 |

FOREIGN PATENT DOCUMENTS

| | | |
|---|---|---|
| 815756 | 12/1955 | (GB) . |
| 1009055 | 11/1963 | (GB) . |

OTHER PUBLICATIONS

Bhushan et al., Handbook of Tribology: Materials, Coatings, and Surface Treatments, p. 7.15, 1997.*

Kirt–Othmer, Encyclopedia of Chemical Technology, 4th Ed., vol. 6, pp. 705–706, Sep. 1993.*

Mark et al., Encyclopedia of Polymer Science and Engineering, vol. 3, p. 552, 1985.*

* cited by examiner

*Primary Examiner*—Paul Thibodeau
*Assistant Examiner*—Ramsey Zacharia
(74) *Attorney, Agent, or Firm*—Lowe Hauptman Gopstein Gilman & Berner

(57) ABSTRACT

A zinc coating directly covers a bare ferrous base of parking meter housing parts. A non-epoxy thermosetting electrically insulating organic non-epoxy powder coating directly covers the zinc coating. The organic coating is directly applied to the zinc coating by electrostatically charging the powder and parts with opposite d.c. voltage polarities and by heating the powder so it adheres to and covers the zinc coating. Alternatively, the base is zinc, directly covered by the organic powder coating.

8 Claims, 3 Drawing Sheets

HOUSINGS FOR PARKING METERS AND OTHER OUTDOOR TOKEN HANDLING DEVICES AND METHOD OF MAKING AND REFURBISHING SAME

FIELD OF INVENTION

The present invention relates generally to housings for parking meters and other outdoor token handling devices, such as consoles for accepting credit and debit cards, made of metal based material and to methods of making and refurbishing same and, more particularly, to such devices and methods wherein a thermosetting powder is electrostatically applied to (1) a galvanized metal layer covering a bare ferrous based substrate or (2) a bare zinc substrate.

BACKGROUND ART

Parking meter housings include several different parts made of metal based material. To enable the parking meter housing parts to withstand the abuse to which they are subjected, the parts are usually made of cast iron or zinc, and electrostatically powder coated. Housings of other outdoor token accepting devices, such as consoles for accepting credit and debit cards for several adjacent parking spaces, include parts having a steel base. These token accepting devices are subject to many adverse conditions, such as vandalism and harsh environmental conditions. The vandalism is frequently of the petty type, such as cutting the housing surface with a knife. The harsh environmental conditions include oxidation, leading to rusting of housing parts having a ferrous base, and/or hydrocarbon deposits resulting from automotive vehicle tailpipe emissions, for example. Because of these adverse conditions, parking meters housings and other outdoor token accepting devices generally must undergo substantial maintenance after only five to seven years of use. However, the maintenance usually only includes spray painting the housings, which does not put the meters and other token handling devices back into anything resembling new condition.

Officials of several jurisdictions have also decided that parking meters, and the like, can be used for beautification purposes. For example, officials in seashore communities have decided parking meter housings should have a teal color to complement the color of the adjacent sea. Other communities have decided the usual battleship gray color of parking meter housings is inappropriate and have decided the housings should be a silver like color. The expectation is that an attractive color for parking meter housings and the housings of related devices will be attractive to visitors and might reduce petty vandalism.

I am aware of the prior art disclosing the combination of a ferrous substrate, a galvanized coating on the ferrous substrate and an organic powder coating over the galvanized coating. For example, Geary et al., U.S. Pat. No. 4,540,637 indicates a steel surface must be thoroughly cleaned of dirt, oil, oxidation products and other foreign matter prior to the deposition of a powder coating on the steel. Geary et al. also discloses applying such coatings over mild or "black" steel. The '637 patent also states surface preparation systems have been developed for mild steel. The preparation systems typically include first cleaning the steel and sometimes roughening it, then rinsing the steel with a solution which deposits a microscopic layer of crystalline material, such as zinc phosphate, on the steel. The microscopic layer passivates the surface against corrosion and provides bonding sites for the powder. Geary et al. specifically states that hot dipped or electroplated galvanized coatings on steel substrates are not normally recommended as a base for thermosetting organic powder coatings. This is so despite the superior resistance to corrosion provided by the zinc cladding of the galvanized layer. Geary et al. states previous experience has shown the thermosetting organic powders do not bond as well to the inherently smooth zinc cladding as to properly prepared mild steel.

This problem was previously recognized by Wlodek in U.S. Pat. No. 3,674,445. Wlodek attempts to solve the problem by vacuum vapor depositing zinc onto the steel substrate. As Geary et al. points out, vacuum vapor depositing zinc is an exotic technique which produces microscopically rough surfaces as compared to galvanized steel. Vacuum vapor deposition can only occur in vacuum processing facilities at very low pressures, on the order of $10^{-5}$ Torr or less. Such processes are not generally suitable for large scale deposition on large products, but are generally used extensively in processing of small articles, such as integrated circuits.

Geary et al. points out that the problem of depositing a thermosetting organic powder on a zinc coating covering a ferrous base has previously been dealt with by Gemmer in U.S. Pat. No. 3,090,696 and Wamant et al., UK Patent 815 756, both of which say coating adhesion is improved by roughening the surface prior to applying the coating. In Wamant et al., "anchor cavities" are created on the surface to achieve good adherence. Bannister, in UK Patent 1 009 055, recommends blasting the surface to be coated with abrasive particles, such as steel shot, to clean the surface and, presumably, to roughen it.

Geary et al. deals with this problem by avoiding the roughening steps through a four-step pretreatment process, including immersing a ferrous workpiece into an acidified rinse including chromium compounds. However, the use of a substantial amount of chromium compounds is inadvisable in large scale manufacturing processes because of the environmental problems associated therewith.

It is, accordingly, an object of the present invention to provide new and improved housings for parking meters and for other similar metal based token accepting devices which are primarily in an outdoor environment.

Another object of the present invention is to provide a new and improved method of protecting metal based parts of parking meter housings and housings of other related token accepting devices.

A further object of the invention is to provide a new and improved method of refurbishing metal based parts of parking meter housings and the housings of other token accepting devices which are primarily used outdoors.

A further object of the invention is to provide a new and improved parking meter housing which is able to withstand vandalism to a greater extent than existing parking meter housings and is less subject to adverse effects of the environment, such as oxidation and/or deposition of organic compounds on the housing.

THE INVENTION

In accordance with one aspect of the present invention, the problems with the prior art processes are obviated by centrifuging parking meter and other outdoor token accepting device parts while a hot dipped zinc layer is still in a molten state on a clean, bare ferrous base or substrate of the part. The meter parts are then processed the same as in conventional galvanizing operations, i.e. washed in HCl, then pickled in a Zn-Pb bath including some Al and then washed in a water bath including some chromate. The galvanized parts then dry, perhaps for many days, but for considerably more than six hours, before being electrostatically powder coated with a non-epoxy organic, electrical insulating electrically charged thermosetting powder. The powder is applied directly to the thus treated galvanized layer on the cast iron substrate, without requiring the use of phosphoric acid which forms and randomly distributes small amounts of zinc phosphate crystals over the substrate surface prior to application of the powder. Hence, certain problems of the Geary et al. patent are avoided.

By centrifuging the parking meter parts under these conditions, excess zinc is removed from the parts to form a somewhat smooth and somewhat rough zinc surface covering the substrate. Such a surface enables a non-epoxy, organic electrical insulating, electrically charged thermosetting powder to adhere to the oppositely charged zinc layer covering the bare ferrous substrate. The powder is then heated to a molten state and cooled. The organic powder cannot be an epoxy because epoxy powders do not have the ability to withstand the harsh environmental conditions to which parking meters and other similar outdoor metal based consoles are exposed.

It has been found, through actual use and experimentation, that excellent adherence properties are attained as a result of the foregoing process. Theoretical analysis leads to the conclusion that a parking meter or other suitable outdoor token accepting device having a ferrous substrate on which a zinc layer is deposited and covered by a non-epoxy, organic, electrical insulating, thermosetting, powder coating has a life expectancy of 60 to 70 years. If the housing is vandalized, for example, by a knife, the galvanized layer "grows" into the cut created by a knife, to preserve the superior corrosion resistant characteristics of the housing part of the parking meter or other similar outdoor token accepting device.

In accordance with another aspect of the invention, a housing of a parking meter or other token accepting structure, subject to abuse and adverse environmental effects, comprises at least one part having a base of a bare ferrous material, a zinc first coating directly covering the bare base of ferrous material, and a second coating of non-epoxy, thermosetting, electrically insulating, non-epoxy organic powder directly covering the first coating. The second coating is directly applied to the first coating by electrostatically charging the powder and the part with opposite d.c. voltage polarities and by heating the powder so it adheres to and covers the first coating.

The powder is preferably selected from the group including polyurethane, acrylics and nylon to form the second coating with a thickness in the range of about 2.5 to 5 mils. If the powder coating thickness is less than about 2.5 mils, the zinc layer is not adequately covered; if the powder coating thickness exceeds about 5 mils, excessive amounts of powder are used to increase powder cost unnecessarily and likely cause flaking of the powder. To assist in providing proper powder coating adherence the zinc coating has a somewhat rough and somewhat smooth surface.

Another aspect of the invention relates to a method of refurbishing an article having a metal base carrying coatings including rust and hydrocarbons. The method includes removing the coatings by brush blasting materials in the coatings to expose the metal base so it is clean and dry. Then a non-epoxy thermosetting electrically insulating organic powder is powder coated on the clean and dry exposed metal base by applying opposite polarity DC charges to the powder and the base and heating the powder while the charges are applied so the powder adheres to and covers the clean and dry exposed metal base.

More particularly in another embodiment, the method involves refurbishing an article having a zinc base carrying coatings including rust and hydrocarbons. The rust and hydrocarbon coatings are loosened by brush blasting with a grit. The article is then bathed in phosphoric acid, and then bathed in water so the zinc base is exposed. Then, after the article is dry, a non-epoxy thermosetting electrically insulating organic powder is powder coated on the dry zinc base by applying opposite polarity DC charges to the powder and the base and heating the powder while the charges are applied so the powder adheres to and covers the dry zinc base.

A further aspect of the invention relates to a method of protecting articles having a clean and exposed bare ferrous base. The method comprises applying a zinc coating to the clean and exposed bare ferrous base by hot dipping the article. The article is then centrifuged while the dip is still hot to remove excess amounts of the zinc coating. The zinc coating thereby has a somewhat smooth and somewhat rough surface. Then a non-epoxy thermosetting electrically insulating organic powder coating is applied to the somewhat smooth and somewhat rough zinc coating surface by applying opposite polarity DC charges to the powder and the surface. The powder is heated while the charges are applied so the powder adheres to and covers the somewhat smooth and somewhat rough zinc coating surface.

The method is, in one embodiment, used to refurbish the articles. The articles, prior to the refurbishing, have undesirable coatings on the ferrous base. Materials in the undesirable coatings are loosened, by burning, from the ferrous base, to provide loose and flaked particles of the undesirable coating materials on the article surface. The loose and flaked particles are mechanically displaced from the article surface so a bare surface of the ferrous base is clean and exposed. Preferably, the loose and flaked particles are removed from the article surface by grit brush blasting with a mixture of different sizes of aluminum oxide grit having different sizes, optimally in the range of 24 to 30 gauge.

When the articles are cast iron parts of parking meter housings or steel parts of token accepting device housings subject to abuse and adverse environmental conditions, the parts are machined for correct tolerances to enable the parts to fit properly together during reassembly, after the undesirable coatings thereon have been removed and before the parts are zinc coated.

Another aspect of the invention relates to a zinc base housing part of a parking meter or other token accepting structure subject to abuse and adverse environmental effects. The zinc base is directly covered by a coating of thermosetting electrically insulating non-epoxy organic powder. The coating is directly applied to the zinc base by electrostatically charging the powder and the part with opposite d.c. voltage polarities and by heating the powder so it adheres to and covers the zinc base.

The above and still further objects, features and advantages of the present invention will become apparent upon consideration of the following detailed descriptions of several specific embodiments thereof, especially when taken in conjunction with the accompanying drawings.

DESCRIPTION OF THE PREFERRED EMBODIMENTS

Figure 1:
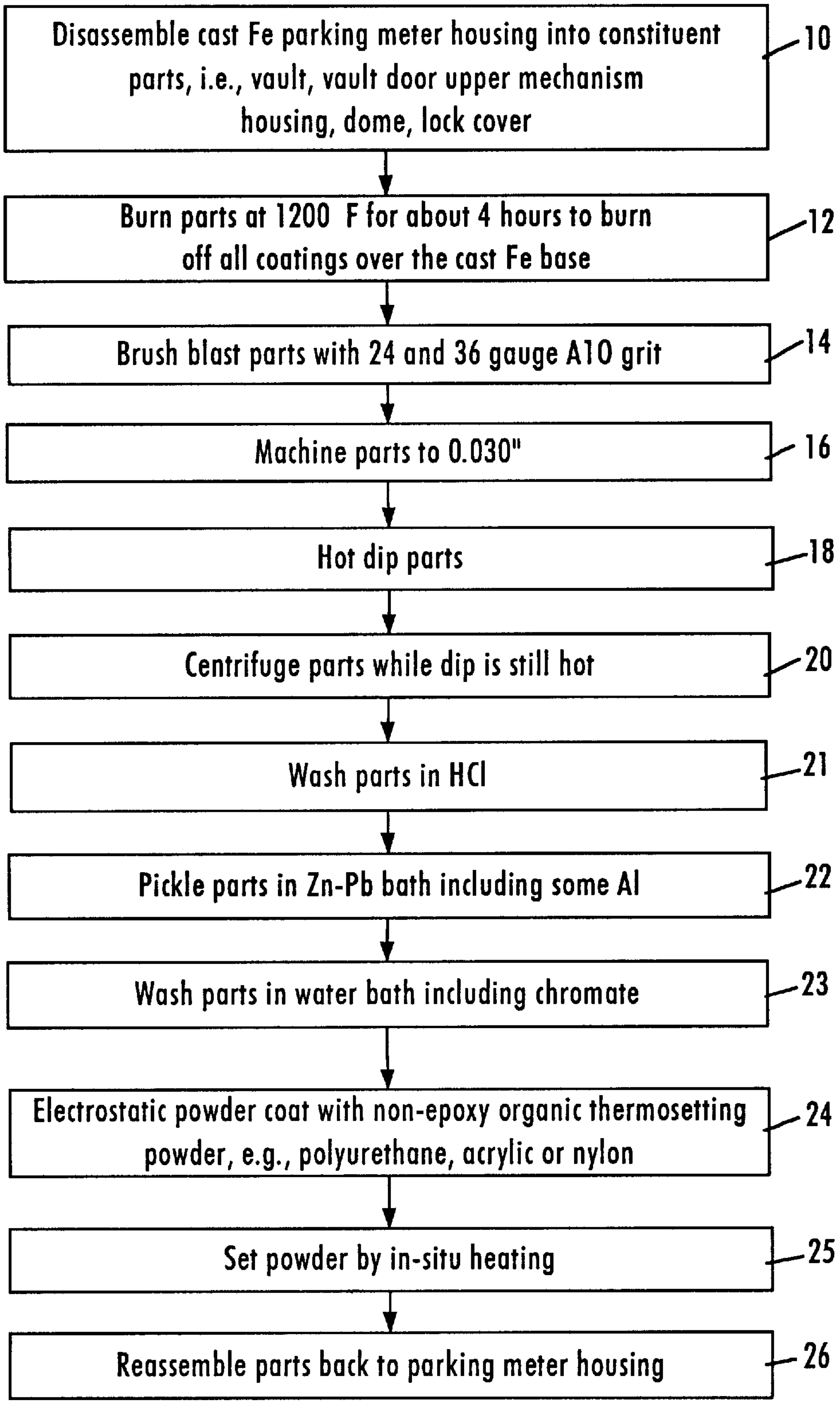
FIG. 1 is a flow diagram of steps taken in accordance with one embodiment of the invention wherein cast iron parking meter housing parts are refurbished.
Figure 2:
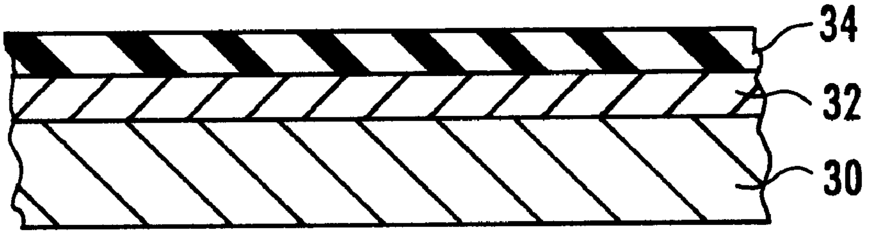
FIG. 2 is a sectional view of a parking meter part after it has been refurbished in accordance with the process of FIG. 1.

Reference is now made to FIGS. 1 and 2 of the drawing. To refurbish a parking meter having cast iron housing parts, the parking meter housing is first disassembled into its constituent parts, typically a vault, vault door, upper mechanism housing, dome and lock cover; operation 10. These cast iron parts that need to be refurbished are usually oxidized, i.e., have rust coatings, as well as hydrocarbon coatings. The rust and hydrocarbon coatings are deposited on the cast iron housing parts as a result of the housing parts being exposed to adverse environmental factors, as described supra.

The disassembled, coated parking meter parts are burned in air in a burnoff oven for approximately four hours by a flame so the parts are heated to approximately 1200° F.; operation 12. The rust and hydrocarbon coatings are dislodged from the cast iron substrates of the housing parts during operation 12.

The housing parts are then brush blasted with 24 and 36 gauge aluminum oxide grit; operation 14. The brush blasting removes all loose and flaked burned coating remnants on the cast iron substrate housing parts. Operation 14 is performed in a reclaiming blast cabinet, at atmospheric pressure and ambient room temperature. The cast iron parking meter piece substrates are now bare and exposed. It has been found by using the 24 and 30 gauge grit that the cast iron bare substrates have a suitable surface for the following steps. The surface is not too smooth and not too rough.

Mating edges of the five parking meter housing parts are then, during operation 16, machined to 30 mils on a milling machine. By removing approximately 30 mils of cast iron from the mating edges of the parts, the parking meter parts have the correct tolerance to enable them to fit together correctly when the entire meter is reassembled. The edges of the parts that are machined to 30 mils are: the round edge of the vault door; the keyhole for the key or lock mechanism; the mechanism housing where the lock fits into the mechanism and the mechanism edge and its four fingers that engage pad points for the dome; the handle and key cover; the dome edges; and the lock cover.

Then, during operation 18, the five parking meter parts having bare, exposed cast iron substrates are hot dipped galvanized to ASTM Designation: A 153-82 (reapproved 1987), The Standard Specification for Zinc Coating (Hot Dipped) on Iron and Steel Hardware. While the zinc coating is still in a molten state, the part is put in a jig and centrifuged at a high speed (operation 20), to remove excess zinc from the part and form a zinc coating 32 having a somewhat smooth, but somewhat rough, galvanized, coating surface. The resulting zinc coating 32 directly applied to bare the surface of cast iron substrate has a thickness in the range of 2.5 to 5 mils, and preferably is approximately 4 mm thick.

Zinc coating 32 provides long term corrosion resistance for the cast iron substrate. If the parking meter part is vandalized, for example, by a knife digging a slit into it, the zinc coating has a tendency to "grow" into the slit formed by the knife, to further ensure long life to the cast iron part. If the thickness of coating 32 is materially less than 2.5 mils, adequate protection for cast iron substrate 30 is not provided. If the thickness of coating 32 thickness is in excess of 5 mils, there is an excess amount of zinc coating on the substrate, to increase the cost of the galvanizing step. In addition, an excessively thick zinc coating has a tendency to not adhere well to cast iron substrate 30. It has also been found that centrifuging the cast iron parts carrying the molten zinc layer at high speed enables the zinc coating surface to be relatively smooth, but not excessively smooth, to assist in proper application of an electrically insulating thermosetting non-epoxy organic powder that forms coating 34.

After the hot dip zinc coating 32 has solidified on substrate 30, the zinc coating is cleaned by washing the parking meter coated parts in a bath of weak hydrochloric acid; operation 21. Then, during operation 22, the parts are pickled in a zinc lead bath including some aluminum. The parts are then washed in a water bath including a very small amount of chromate; e.g., ½% by weight; operation 23. Operations 21–23 are standard galvanizing operations associated with virtually all galvanizing operations.

After the zinc coated, cast iron parking meter parts have dried, they are connected to a positive DC voltage terminal. Then, a non-epoxy organic thermosetting powder, preferably of polyurethane, acrylic or nylon, is electrostatically coated during operation 24, directly on the washed zinc layer 32 of the cast iron parking meter housing parts. One preferred powder is TGIC 900 Series polyester, available from TCI, Ellvaville, Ga. The powder flows as a spray through a nozzle connected to a negative DC power supply terminal so that the powder particles are electrically negatively charged and attracted to the positively charged parking meter housing parts. The resulting powder coatings are preferably applied with a Ransburg Gama electrostatic powder coating machine.

The thermosetting organic powder cannot be an epoxy because epoxies do not have sufficient wear characteristics for the adverse environmental conditions to which parking meter parts are exposed during use. If an epoxy were used, it would turn to chalk. The non-epoxy thermosetting organic electrically insulating powder forms coating 34 having an attractive color, such as teal, silver or any other suitable color, and is applied with a texture of a customer's choice. The parking meter housing parts are heated during operation 25 while the powder is in situ on the parts. During the thermosetting process, the powder melts and flows somewhat to change molecular structure from a powder to a solid mass covering zinc layer 32. Heating is to a sufficient temperature, e.g. 475° F., and for a required time, e.g., 18 minutes, to set the powder to form coating 34. The resulting powder coatings preferably have a thickness of approximately 2.5 mils. The parking meter parts are then reassembled during operation 26 to form the parking meter housing, for shipment to customers.

The parking meter housing part thereby has the configuration illustrated in FIG. 2, wherein one bare exposed face of cast iron substrate 30 is completely covered by zinc coating 32, which is completely covered by powder coating 34.

While the majority of parking meter housings have all cast iron parts, some parking meter housings have both cast iron parts and zinc parts, while other parking meter housings have only zinc parts. The process described for refurbishing cast iron parking meter housing parts is applicable to the cast iron parts of those parking meter housings having both cast iron and zinc parts.

Figure 3:
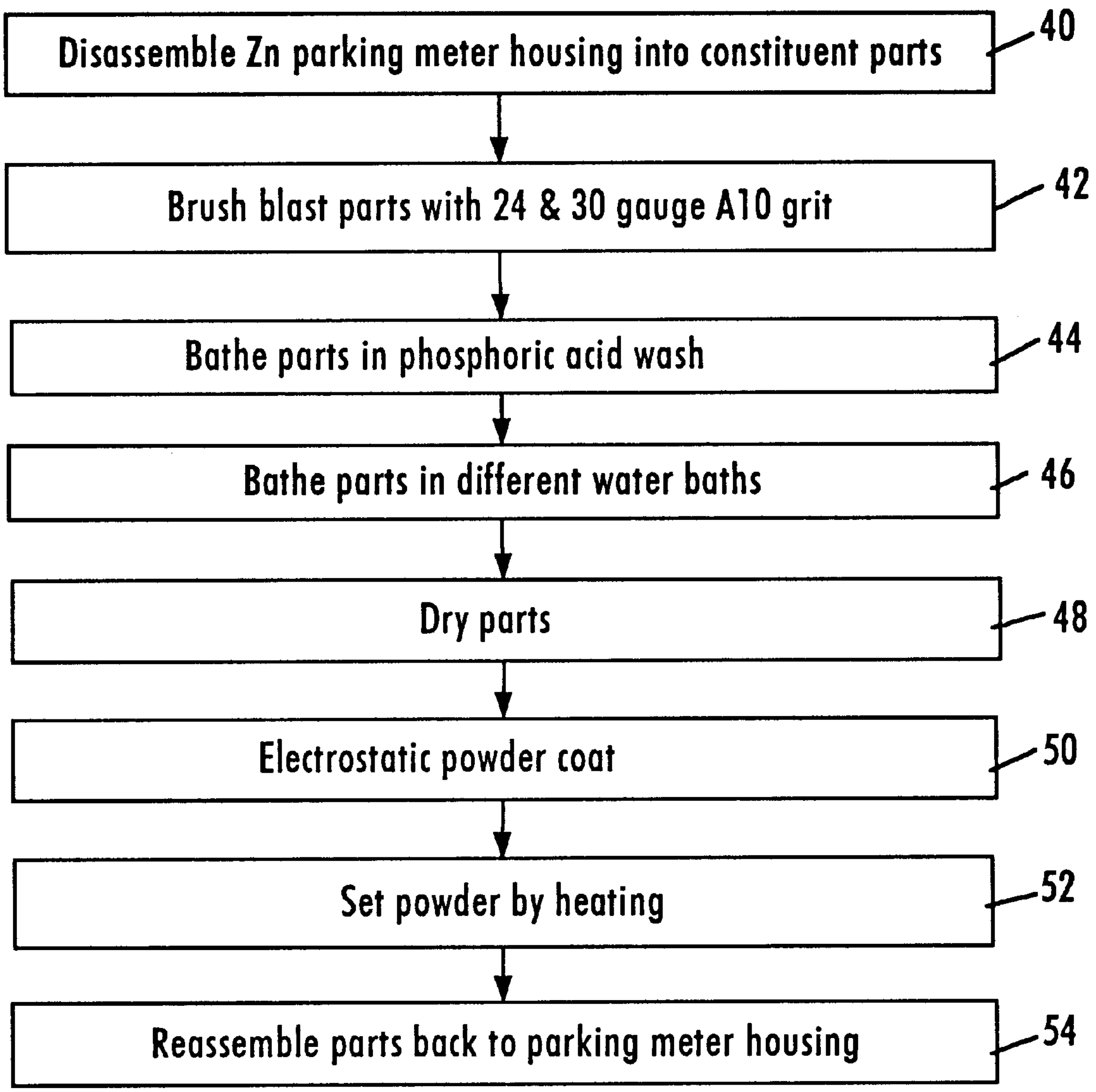
FIG. 3 is a flow diagram of operations performed in accordance with the present invention to refurbish a zinc parking meter housing part.

The parking meter housing parts made of zinc, after being disassembled during operation 40, FIG. 3, are refurbished by brush blasting with 24 and 30 gauge aluminum oxide grit during operation 42, to remove previously existing coatings. The zinc housing parts are not burned, because zinc will not maintain its structural integrity if it is burned to a sufficiently high temperature to remove the oxide and organic coatings. In addition, there is no need to form a zinc coating on housing parts having a zinc base.

After the zinc housing parts have been brush blasted by the 24 and 30 gauge aluminum oxide grit, they are treated during operation 44 in a phosphoric acid wash; the phosphoric acid is preferably $H_3PO_4$. The phosphoric acid wash neutralizes corrosive materials on the zinc housing parts. Then the parking meter housing parts are bathed during operation 46 in a neutralizing tap water wash. Neutralizing step 46 is performed by sequentially dipping each zinc parking meter housing part in several different tap water containing tanks to remove the phosphoric acid. After the tap water neutralizing wash operation 46 has been performed, the parts are dried during operation 48 and then, during operation 50, coated with a non-epoxy thermosetting organic electrically insulating powder, as described above. Then the powder coating is heated so it sets during operation 52. The zinc base, powder coated parts are reassembled during operation 54 to form refurbished parking meter housings.

Figure 4:
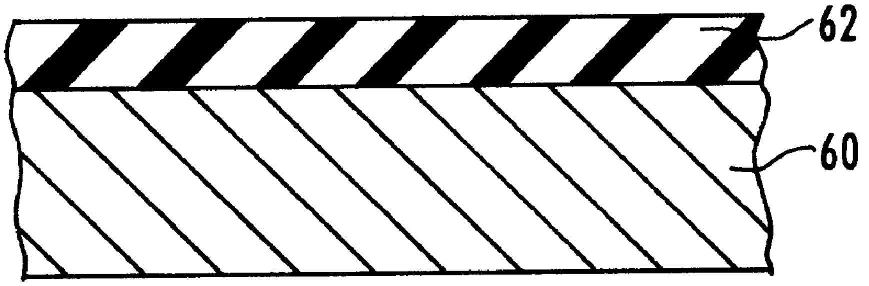
FIG. 4 is a sectional view of a parking meter part refurbished in accordance with the method of FIG. 3.

The resulting zinc structure is illustrated in FIG. 4 as including zinc substrate 60 having a bare upper face on which powder coating 62 is directly deposited.

While there have been described and illustrated several specific embodiments of the invention, it will be clear that variations in the details of the embodiments specifically illustrated and described may be made without departing from the true spirit and scope of the invention as defined in the appended claims.

I claim:

1. A housing of a parking meter or other token accepting structure subject to abuse and adverse environmental effects, the housing comprising at least one cast part having a base of a bare ferrous material, a hot dipped zinc first coating directly covering the bare base of ferrous material, and a second thermosetting electrically insulating organic non-epoxy powder coating directly covering the first coating, the second coating being directly applied to the first coating by electrostatically charging the powder and the part with opposite d.c. voltage polarities and by heating the powder so it adheres to and covers the first coating, the second coating having a thickness of at least 2.5 mils.

2. The housing of claim 1 wherein the powder is selected from the group consisting of polyurethane, acrylic resins, and nylon.

3. The housing of claim 2 wherein the second coating has a thickness in the range of 2.5 to 5 mils.

4. The housing of claim 1 wherein the second coating has a thickness in the range of 2.5 to 5 mils.

5. The housing of claim 4 wherein the second coating has a thickness of about 4 mils.

6. A refurbished parking meter housing comprising several parts including: (a) a vault door, (b) a dome, (c) a lock cover, (d) a handle and key cover, and (e) a mechanism housing including a keyhole structure for receipt of a key or lock mechanism; the several parts having mating edges, each of the parts having a base metal of cast iron free of rust and hydrocarbon coatings, the mating edges being milled, the base metal of each part having a hot dipped galvanized first coating and a second thermosetting electrically insulating organic non-epoxy powder coating directly covering the first coating, the second coating being directly applied to the first coating by electrostatically charging the powder and the part with opposite d.c. voltage polarities and by heating the powder so it adheres to and covers the first coating, the second coating having a thickness of at least 2.5 mils.

7. The housing of claim 6 wherein the second coating has a thickness in the range of 2.5 to 5 mils.

8. The housing of claim 7 wherein the powder is selected from the group consisting of polyurethane, acrylic resin, and nylon.

* * * * *